US012646870B2

(12) United States Patent
Kwon et al.

(10) Patent No.: US 12,646,870 B2
(45) Date of Patent: Jun. 2, 2026

(54) CONNECTOR AND CONNECTOR ASSEMBLY COMPRISING THE SAME

(71) Applicant: Tyco Electronics AMP Korea Co., Ltd., Gyeongsan (KR)

(72) Inventors: Min Jae Kwon, Gyeongsan-Sir (KR); Gi-Chan Kwon, Gyeongsan-Si (KR); Guenther Mumper, Bensheim (DE); Christian Rusch, Bensheim (DE)

(73) Assignee: TYCO ELECTRONICS AMP KOREA CO., LTD., Gyeongsan-si (KR)

( * ) Notice: Subject to any disclaimer, the term of this patent is extended or adjusted under 35 U.S.C. 154(b) by 449 days.

(21) Appl. No.: 18/303,654

(22) Filed: Apr. 20, 2023

(65) Prior Publication Data

US 2023/0344158 A1 Oct. 26, 2023

(30) Foreign Application Priority Data

Apr. 20, 2022 (KR) ........................ 10-2022-0048900
Apr. 20, 2022 (KR) ........................ 10-2022-0048902
Feb. 22, 2023 (KR) ........................ 10-2023-0023930

(51) Int. Cl.
*H01R 12/57* (2011.01)
*H01R 4/2416* (2018.01)
*H01R 12/58* (2011.01)
*H01R 13/502* (2006.01)

(52) U.S. Cl.
CPC ........... *H01R 12/57* (2013.01); *H01R 4/2416* (2013.01); *H01R 12/58* (2013.01); *H01R 13/502* (2013.01)

(58) Field of Classification Search
CPC ...... H01R 12/57; H01R 4/2416; H01R 12/58; H01R 13/502; H01R 13/6592; H01R 12/75; H01R 4/2433
See application file for complete search history.

(56) References Cited

U.S. PATENT DOCUMENTS

| | | | | |
|---|---|---|---|---|
| 8,684,761 | B2 * | 4/2014 | Weaver | H01R 4/242 439/417 |
| 8,714,996 | B2 * | 5/2014 | Bishop | H01R 4/2433 439/417 |
| 9,490,591 | B2 * | 11/2016 | Yamashita | H01R 24/40 |
| 11,088,502 | B1 * | 8/2021 | Tillotson, Jr. | H01R 43/28 |
| 2007/0077814 | A1 * | 4/2007 | Sullivan | H01R 9/0515 439/581 |
| 2012/0329309 | A1 * | 12/2012 | Weaver | H01R 4/242 439/404 |
| 2020/0106210 | A1 * | 4/2020 | Kang | H01R 43/005 |
| 2020/0227857 | A1 * | 7/2020 | Kim | H01R 13/6272 |
| 2021/0249828 | A1 * | 8/2021 | Haga | H01R 24/40 |
| 2023/0344158 | A1 * | 10/2023 | Kwon | H01R 12/75 |

FOREIGN PATENT DOCUMENTS

JP 3967469 B2 * 8/2007

* cited by examiner

*Primary Examiner* — Abdullah A Riyami
*Assistant Examiner* — Nader J Alhawamdeh

(57) ABSTRACT

A connector assembly includes a printed circuit board (PCB), a plurality of terminals disposed on the PCB, a main body disposed on the PCB and supporting the terminals, a cable supported by the terminals, and a housing coupled to the main body, covering the cable, and spaced apart from the PCB. The main body has a holding point contacting an external jig. A space into which the external jig is inserted is provided between the main body and the PCB.

20 Claims, 14 Drawing Sheets

CONNECTOR AND CONNECTOR ASSEMBLY COMPRISING THE SAME

CROSS-REFERENCE TO RELATED APPLICATIONS

This application claims the benefit under 35 USC § 119(a) of Korean Patent Application No. 10-2022-0048900, filed on Apr. 20, 2022, Korean Patent Application No. 10-2022-0048902, filed on Apr. 20, 2022, and Korean Patent Application No. 10-2023-0023930, filed on Feb. 22, 2023.

FIELD OF THE INVENTION

The following description relates to a connector and a connector assembly including the same.

BACKGROUND

A connector is a type of component that selectively allows or disallows electrical connection. For example, an automobile is provided with many electrical components such as electronic components or sensors, and these electrical components are electrically connected to other electrical components or a power supply through connectors.

The above description has been possessed or acquired by the inventor(s) in the course of conceiving the present disclosure and is not necessarily an art publicly known before the present application is filed.

SUMMARY

A connector assembly includes a printed circuit board (PCB), a plurality of terminals disposed on the PCB, a main body disposed on the PCB and supporting the terminals, a cable supported by the terminals, and a housing coupled to the main body, covering the cable, and spaced apart from the PCB. The main body has a holding point contacting an external jig. A space into which the external jig is inserted is provided between the main body and the PCB.

BRIEF DESCRIPTION OF THE DRAWINGS

Exemplary embodiments of the invention are described by way of the following drawings. In the drawings.

and

Figure 21:
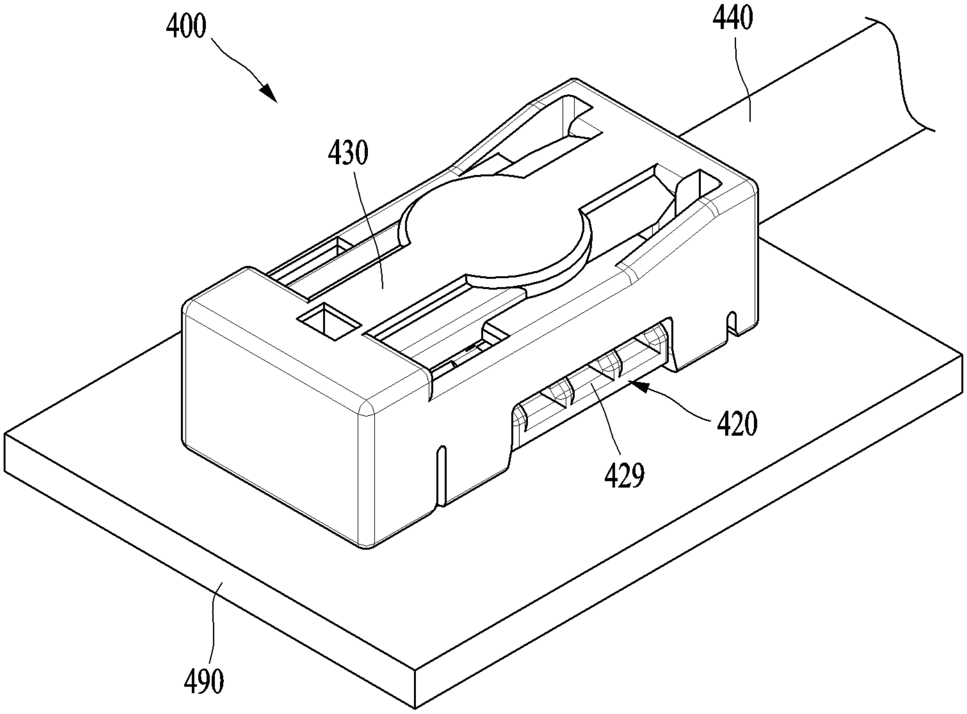

FIG. 21 is a perspective view of a connector assembly according to an embodiment.

DETAILED DESCRIPTION OF THE EMBODIMENT(S)

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

Hereinafter, embodiments are described in detail with reference to the accompanying drawings. The following description describes one of several aspects of the embodiments, and the following description forms part of the detailed description of the embodiments. In the description of an embodiment, any detailed description of a well-known function or configuration is not included to clearly convey the gist of the present disclosure.

However, various alterations and modifications may be made to the embodiments. Thus, the embodiments are not meant to be limited by the descriptions of the present disclosure. The embodiments should be understood to include all changes, equivalents, and replacements within the idea and the technical scope of the disclosure.

In addition, the terms or words used to describe the present disclosure and claims should not be construed in a conventional or dictionary meaning, and based on a principle that the inventor may properly define the concept of terms in order to best describe their invention, the terms or words should be construed as having meanings and concepts consistent with the technical idea of the disclosure according to an embodiment.

The singular forms “a,” “an,” and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the embodiments belong. Terms defined in dictionaries generally used should be construed as having meanings matching contextual meanings in the related art and are not to be construed as having an ideal or excessively formal meaning unless otherwise defined herein.

When describing the embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

Figure 1A:
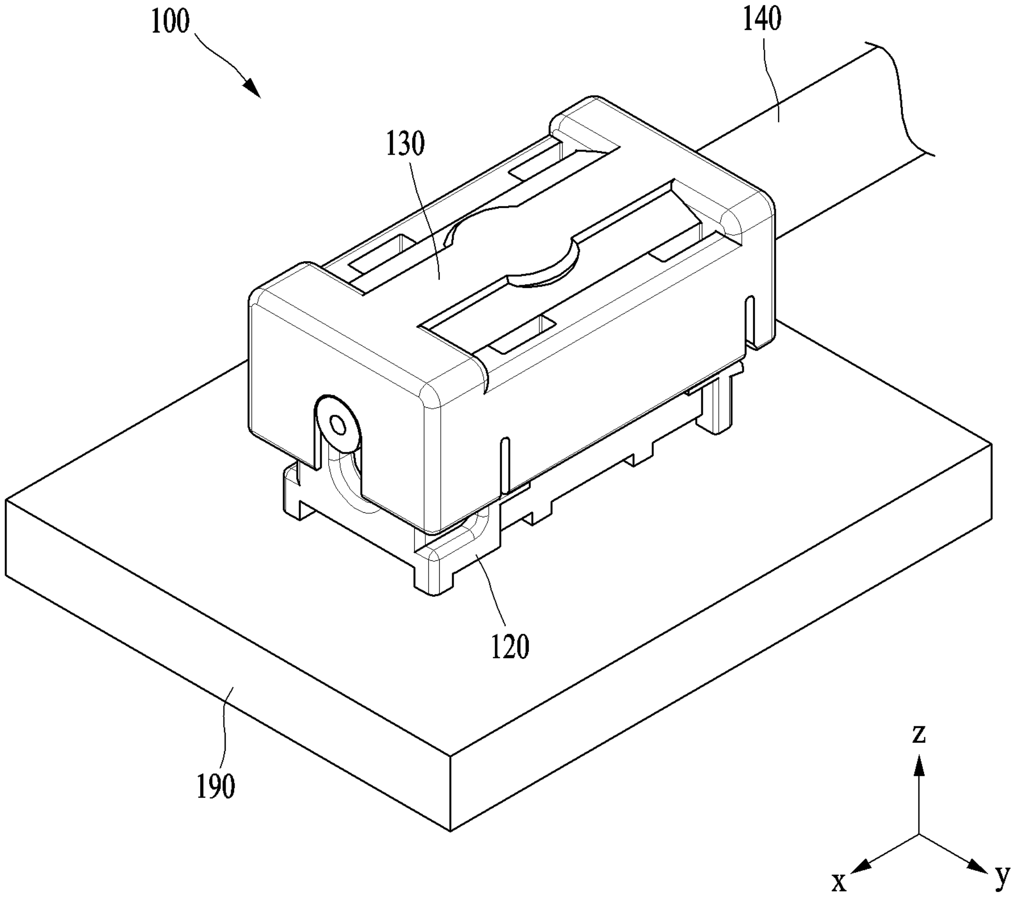
FIG. 1A is a perspective view of a connector assembly according to an embodiment.
Figure 1B:
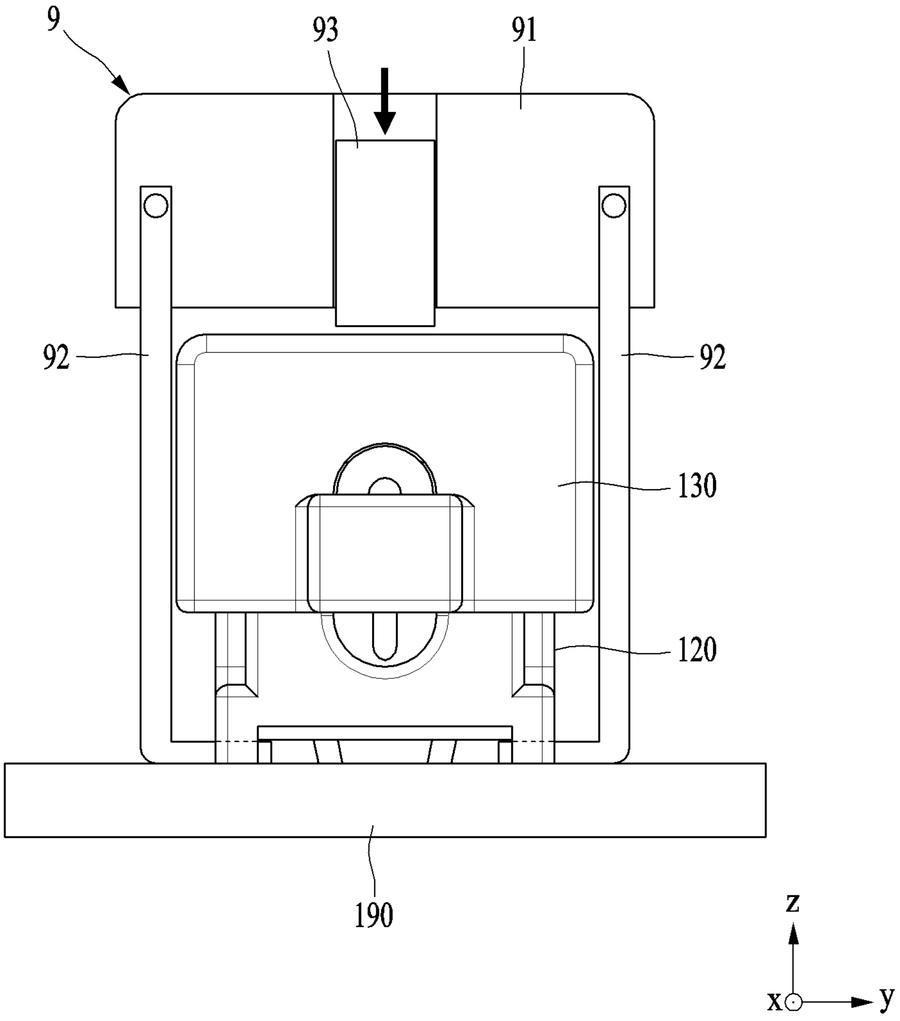
FIG. 1B is a front view of the connector assembly and a jig, according to an embodiment.
Figure 1C:
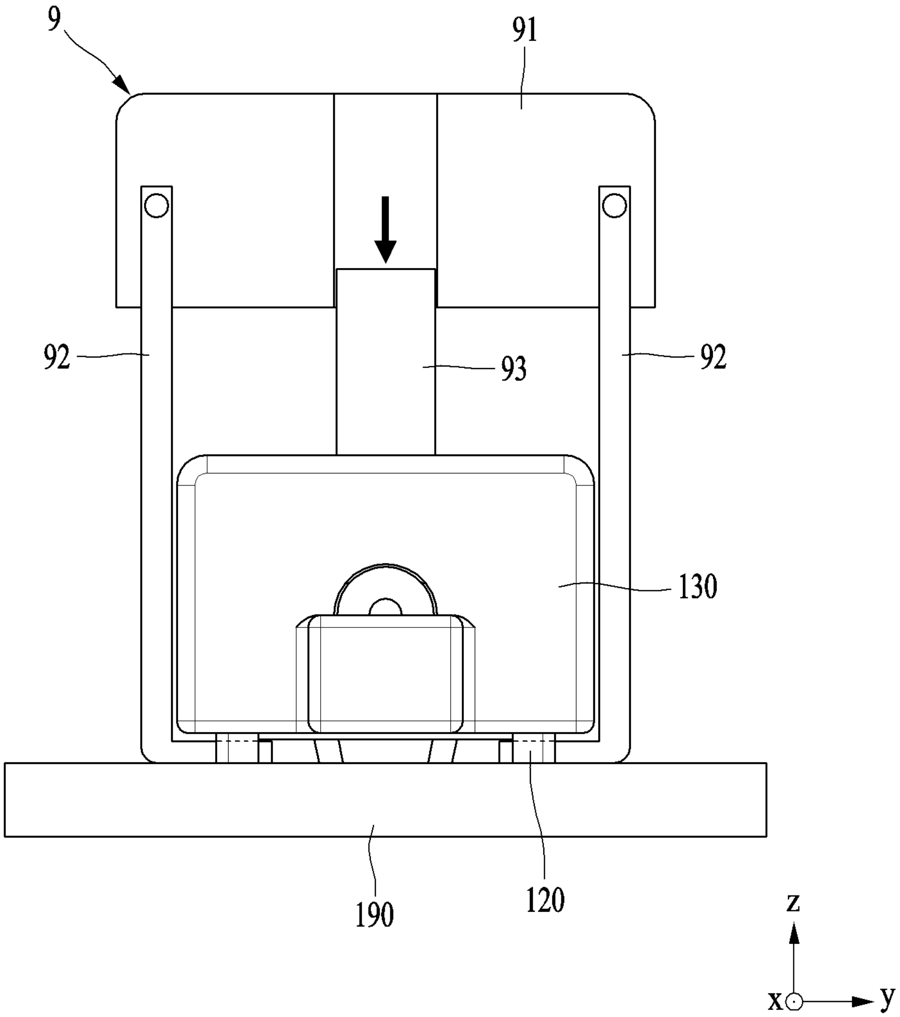
FIG. 1C is a front view of the connector assembly and the jig when the connector assembly is fully coupled, according to an embodiment.

FIG. 1A is a perspective view of a connector assembly according to an embodiment. FIG. 1B is a front view of the connector assembly and a jig, according to an embodiment. FIG. 1C is a front view of the connector assembly and the jig when the connector assembly is fully coupled, according to an embodiment.

Figure 2:
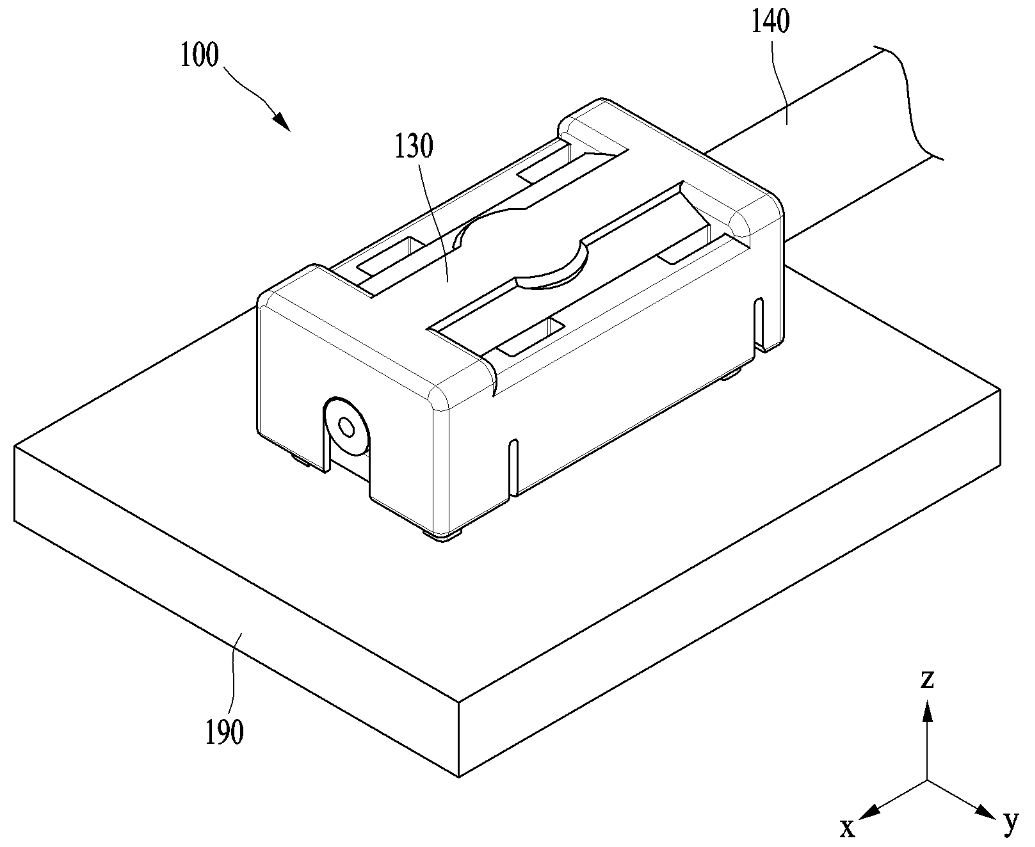
FIG. 2 is a perspective view of a state in which a housing of FIG. 1 is fully fastened to a main body.
Figure 3:
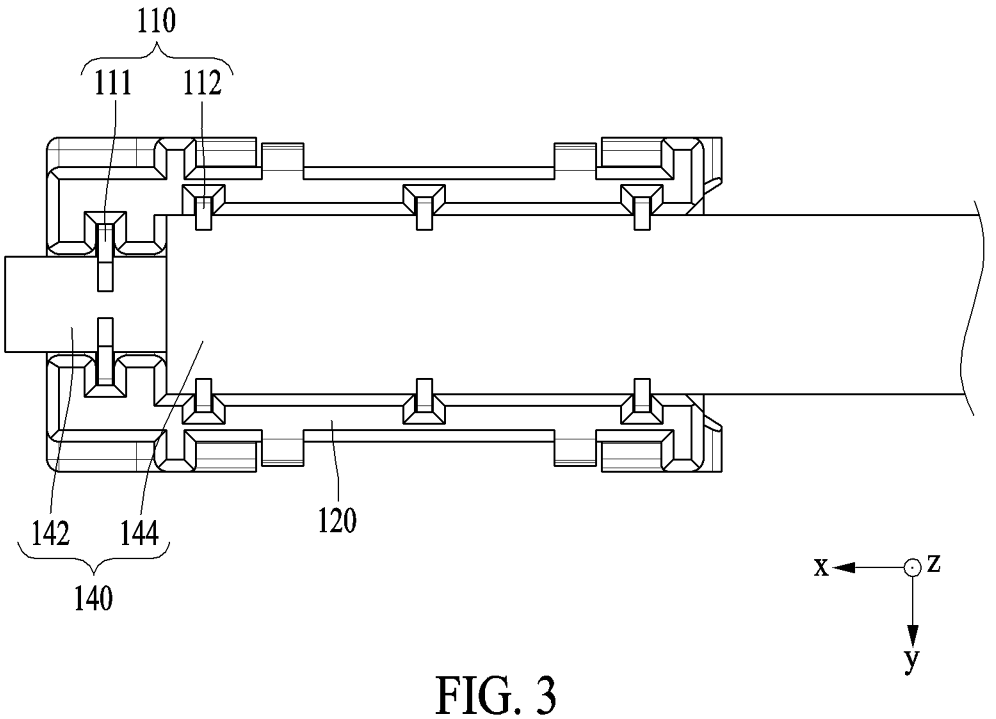
FIG. 3 is a plan view of the connector assembly from which the housing is omitted, according to an embodiment.
Figure 4:
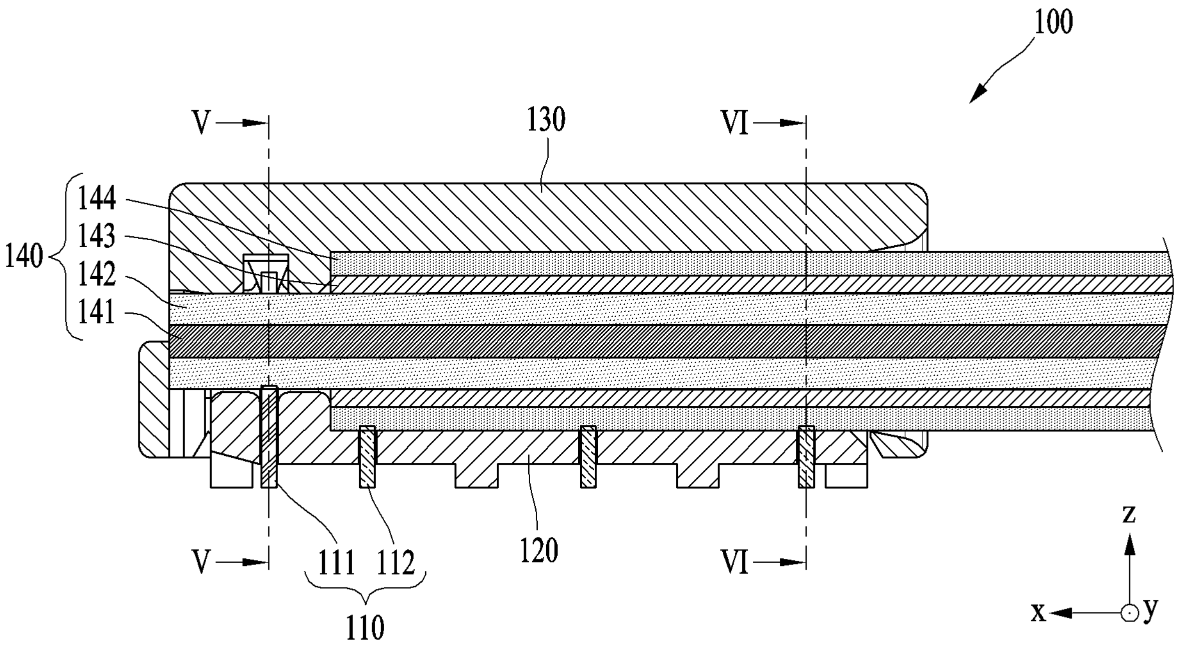
FIG. 4 is a cross-sectional view of the connector assembly according to an embodiment.
Figure 5:
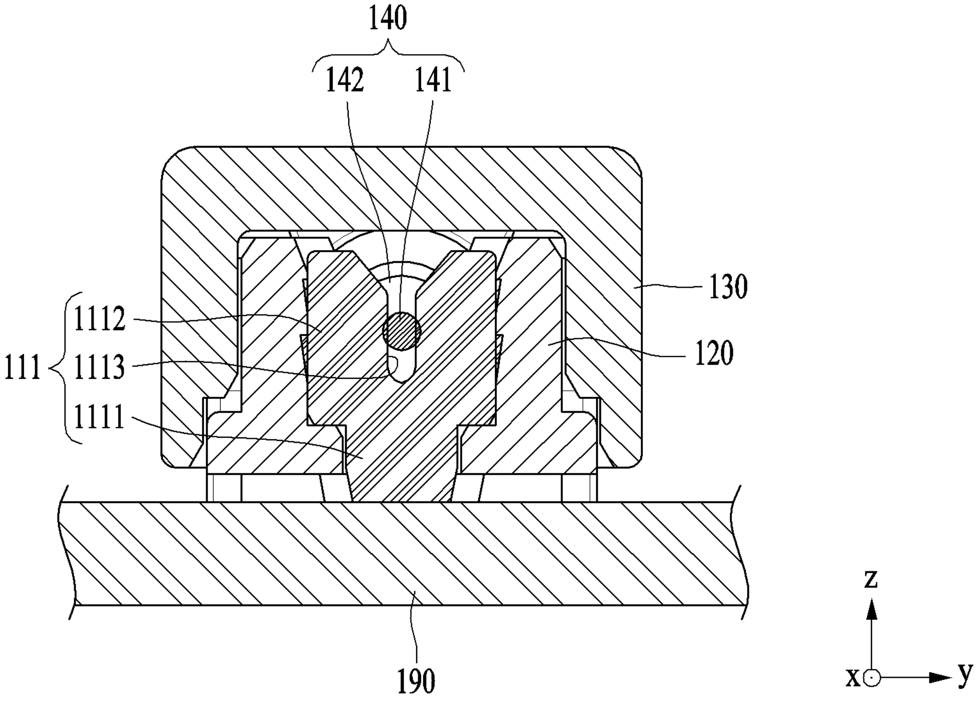
FIG. 5 is a cross-sectional view of the connector assembly taken along the line V-V of FIG. 4.
Figure 6:
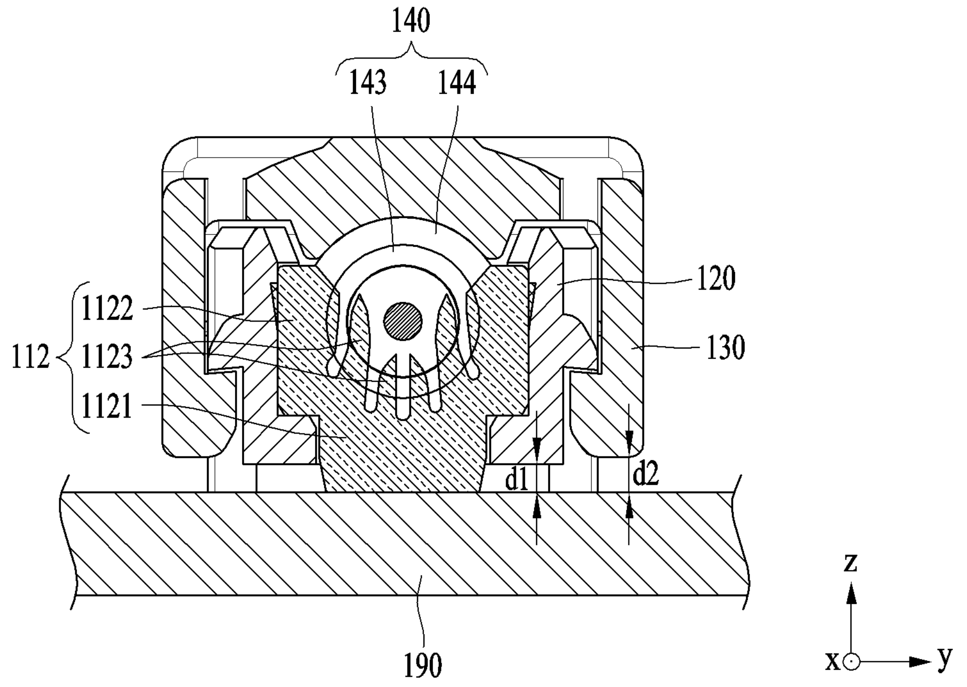
FIG. 6 is a cross-sectional view of the connector assembly taken along the line VI-VI of FIG. 4.
Figure 7:
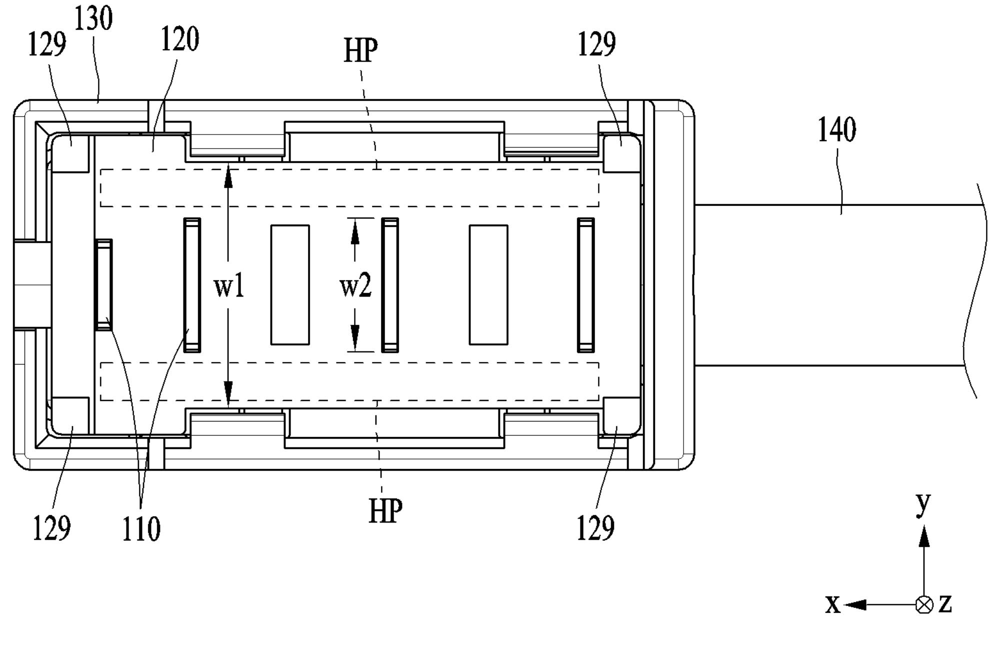
FIG. 7 is a bottom view of the connector assembly from which a printed circuit board (PCB) is omitted, according to an embodiment.

FIG. 2 is a perspective view of a state in which a housing of FIG. 1 is fully fastened to a main body. FIG. 3 is a plan view of the connector assembly from which the housing is omitted, according to an embodiment. FIG. 4 is a cross-sectional view of the connector assembly according to an embodiment. FIG. 5 is a cross-sectional view of the connector assembly taken along the line V-V of FIG. 4. FIG. 6 is a cross-sectional view of the connector assembly taken along the line VI-VI of FIG. 4. FIG. 7 is a bottom view of the connector assembly from which a printed circuit board (PCB) is omitted, according to an embodiment.

Referring to FIG. 1A to 7, a connector assembly 100 may include a PCB 190, a cable 140, and a connector. The connector may electrically and physically connect the PCB 190 to the cable 140. The connector may include a plurality of terminals 110, a main body 120, and a housing 130.

When the connector accommodates the cable 140, a worker may couple the housing 130 to the main body 120 by applying a force to the top surface of the housing 130 in a downward direction. The cable 140 may be pressed by the housing 130 and the main body 120 from top and bottom sides. The cable 140 may be electrically connected to the plurality of terminals 110. Herein, the downward direction may be a direction in which the PCB 190 is placed based on the main body 120. In the drawings, an upward direction may be a +z direction and the downward direction may be a −z direction. When the housing 130 is fully coupled to the main body 120, the plurality of terminals 110 may be electrically and physically connected to the cable 140.

A longitudinal direction of the cable 140 may be provided in an x-axis direction. The cable 140, as shown in FIGS. 3 and 4, may include an inner conductor 141 transmitting a signal, an insulator 142 enclosing the inner conductor 141, a cable shield 143 enclosing the insulator 142 and reducing noise occurrence, and an outer jacket 144 enclosing the cable shield 143. The insulator 142 may include a material that is more flexible than the inner conductor 141. The outer jacket 144 may include a material that is more flexible than the cable shield 143. The insulator 142 and the outer jacket 144 may include, for example, rubber. The insulator 142 and the outer jacket 144 may include an insulating material.

The inner conductor 141 and the insulator 142 may protrude in a front direction compared to the cable shield 143 and the outer jacket 144. At the front end of the cable 140, only the inner conductor 141 and the insulator 142 may be provided. In other words, at least a portion of the insulator 142 may not be covered by the cable shield 143 and/or the outer jacket 144.

While supporting the lower side surface of the main body 120 with a separate jig, that is, a jig 9, shown in FIGS. 1B and 1C, a worker may press the housing 130 in the downward direction. The housing 130 may move in a direction toward the PCB 190. While the housing 130 moves, the plurality of terminals 110 may cut a sheath portion of the cable 140 and may penetrate into a metal portion of the cable 140. The plurality of terminals 110 may contact the metal portion of the cable 140.

The jig 9 may include a jig body 91, a pair of jig arms 92 rotatably connected to the jig body 91, and a slider 93 slidable in a vertical direction along the jig body 91. In this case, the vertical direction may be a z-axis direction. The pair of jig arms 93 may support the main body 120. The slider 93 may press the housing 130.

Since the jig 9 supports the main body 120, a force applied to the housing 130 may not be directly transmitted to the PCB 190. Herein, a portion of the main body 120 supported by the jig 9 may be referred to as a holding point HP, shown in FIG. 7. The holding point HP may be a plane. At least a portion of the bottom surface of the main body 120 may be spaced apart from the PCB 190. The holding point HP may be spaced apart from the top surface of the PCB 190 in the z-axis direction.

When the main body 120 is fully coupled to the housing 130, a distance d2 between the bottom surface of the housing 130 from the PCB 190 may be greater or equal to a distance d1 between the holding point HP and the PCB 190, shown in FIG. 6. According to the structure described above, while the main body 120 is coupled to the housing 130, the jig 9 may not interfere with the housing 130. For example, a portion of the main body 120 may be connected to the PCB 190 and another portion of the main body 120 may be spaced apart from the PCB 190.

The plurality of terminals 110 may support the cable 140. When the main body 120 is fully coupled to the housing 130, the plurality of terminals 110 may be electrically and physically connected to the cable 140. The plurality of terminals 110 may be spaced apart from each other in the longitudinal direction of the cable 140. The plurality of terminals 110 may be provided parallel with the x-axis direction. The plurality of terminals 110 may include a conductor terminal 111 provided to cut the insulator 142 and contact the inner conductor 141 and a shield terminal 112 provided to cut the outer jacket 144 and contact the cable shield 143. The width of the conductor terminal 111 may be less than the width of the shield terminal 112. In this case, the width may be a length in the y-axis direction.

The plurality of terminals 110 may be accommodated inside the main body 120. The main body 120 may include a plurality of grooves for accommodating the plurality of terminals 110 therein. The upper end of the conductor terminal 111 may be on the upper side of the insulator 142.

The conductor terminal 111, as shown in FIG. 5, may include a conductor terminal body 1111 fixed to the PCB 190, a pair of conductor terminal arms 1112 protruding from the conductor terminal body 1111, and a conductor terminal groove 1113 between the pair of conductor terminal arms 1112. The width of the conductor terminal groove 1113 may be less than the width of the inner conductor 141. While the main body 120 is coupled to the housing 130, the insulator 142 may be cut by the pair of conductor terminal arms 1112 and the inner conductor 141 may be inserted into the conductor terminal groove 1113. The pair of conductor terminal arms 1112 may open in the horizontal direction.

The shield terminal 112, as shown in FIG. 6, may include a shield terminal body 1121 fixed to the PCB 190, a pair of shield terminal arms 1122 protruding from the shield terminal body 1121, and a plurality of shield terminal protrusions 1123 provided between the pair of shield terminal arms 1122 and protruding in the upward direction from the shield terminal body 1121. While the main body 120 is coupled to the housing 130, the outer jacket 144 may be cut by the pair of shield terminal arms 1122 and the plurality of shield terminal protrusions 1123 may be transformed by the cable shield 143. The plurality of shield terminal protrusions 1123 and/or the pair of the shield terminal arms 1122 may contact the cable shield 143.

The main body 120 may be disposed on the PCB 190. The holding point HP may be provided on the bottom surface of the main body 120. A longitudinal direction of the holding point HP may be provided in parallel with the longitudinal direction of the cable 140. The main body 120 may include a plurality of legs 129 connected to the PCB 190. The jig 9 may be inserted into a space between the plurality of legs 129 and may support the holding point HP. A pair of holding points HP may be provided. The pair of holding points HP may be arranged opposite to each other based on the plurality of terminals 110.

The bottom surface of the main body 120 may have a width in the y-axis direction. The length of a width w1 that is relatively small among widths of the main body 120 may be greater than the length of a width w2 that is relatively large among widths of the plurality of terminals 110. In other words, the width of the main body 120 may be greater than the width of each of the plurality of terminals 110. The holding point HP may be provided in a portion of the main body 120 in which the plurality of terminals 110 is not provided.

When viewed from the bottom surface of the main body 120, the plurality of terminals 110 may be disposed on the central portion of the main body 120. For example, the plurality of terminals 110 may be disposed on the center of the main body 120 along a center line of the main body 120. In this case, the center line may be a line provided in the x-axis direction along the center of the bottom surface of the main body 120. The plurality of terminals 110 may be disposed on the center of the main body 120. The center of each of the plurality of terminals 110 may be disposed along the center line of the main body 120. A gap may exist from both edge parts of each of the plurality of terminals 110 to an edge of the main body 120.

The housing 130 may be connected to the main body 120. The housing 130 may cover the main body 120. The housing 130 may enclose a circumference of the main body 120.

Because a gap is provided between the PCB 190 and the housing 230, the jig 9 may be easily inserted between the PCB 190 and the housing 230. The main body 120 may be supported by the jig 9. While the main body 120 is supported by the jig 9, because a force is applied to the housing 230 in a direction toward the PCB 190, damage to the PCB 190 may be detected or prevented.

Figure 8:
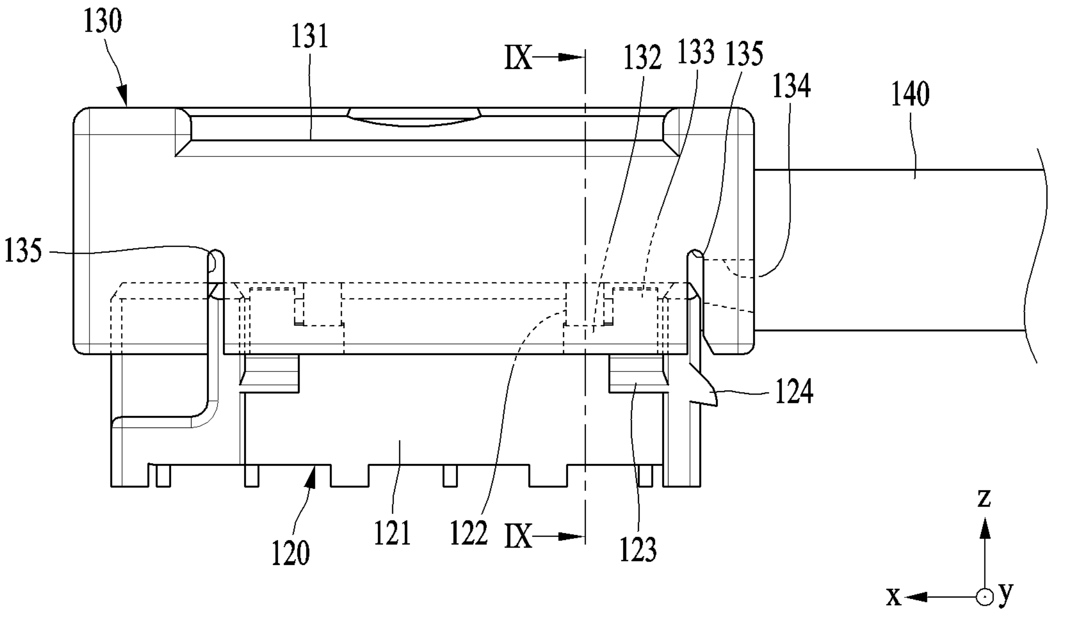
FIG. 8 is a side view of a connector assembly according to an embodiment.
Figure 9:
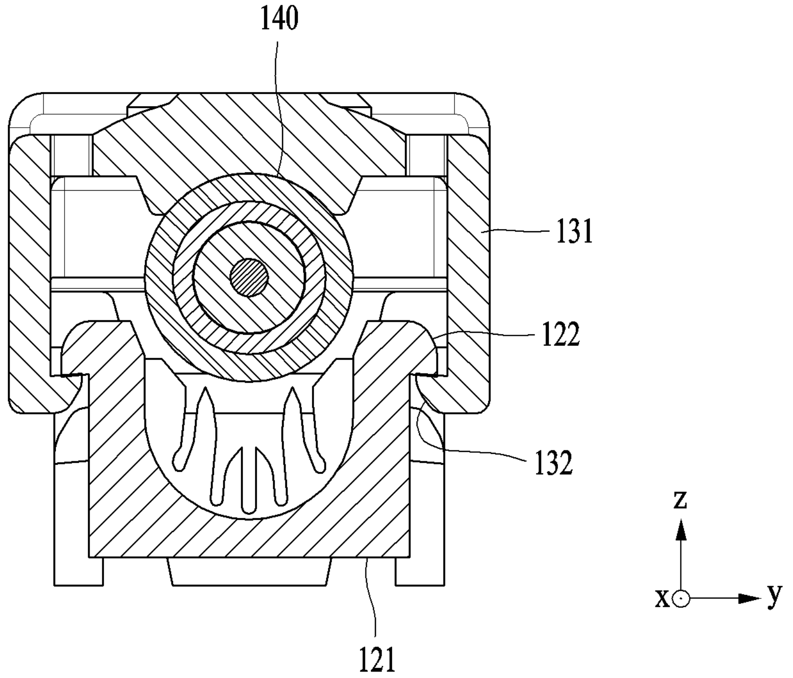
FIG. 9 is a cross-sectional view taken along the line IX-IX of FIG. 8.
Figure 10:
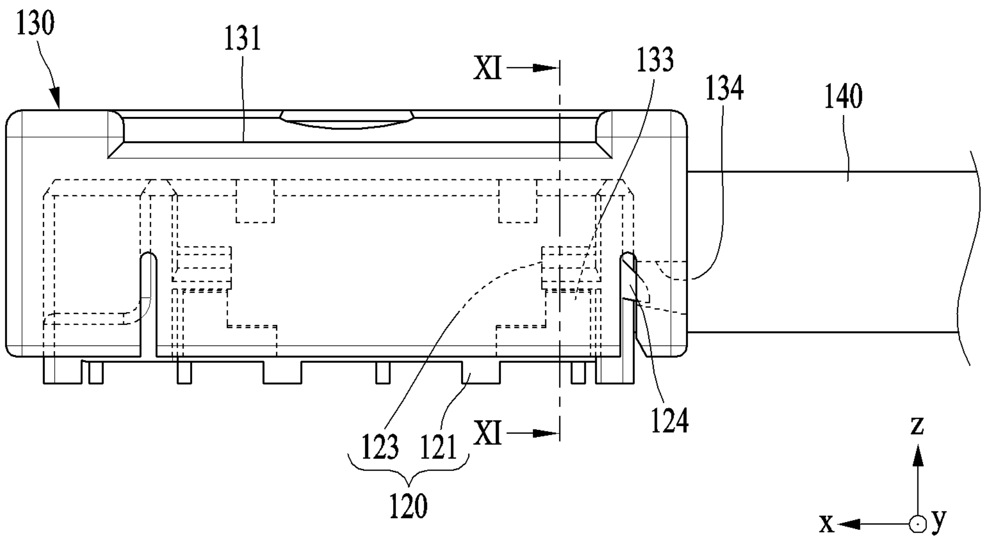
FIG. 10 is a side view of the connector assembly according to an embodiment.
Figure 11:
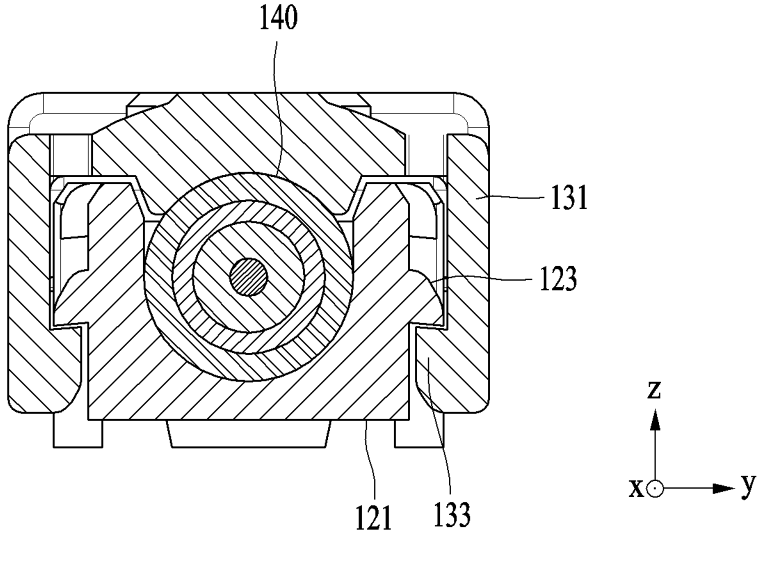
FIG. 11 is a cross-sectional view taken along the line XI-XI of FIG. 10.

FIG. 8 is a side view of a connector assembly according to an embodiment. FIG. 9 is a cross-sectional view taken along the line IX-IX of FIG. 8. FIG. 10 is a side view of the connector assembly according to an embodiment. FIG. 11 is a cross-sectional view taken along the line XI-XI of FIG. 10.

Referring to FIGS. 8 to 11, the connector assembly may include the housing 130 and the main body 120 accommodating the cable 140. The main body 120 and the housing 130 may include a plurality of latches. FIGS. 8 and 9 illustrate a state in which the main body 120 is not fully coupled to the housing 130. The main body 120 may be temporarily coupled to the housing 130. An event in which the housing 130 unintentionally is separated from the main body 120 may be prevented by first latches of the main body 120 and the housing 130. FIGS. 10 and 11 illustrate a fully-coupled state in which the main body 120 is fully coupled to the housing 130. In the fully-coupled state, releasing of the coupling of the main body 120 to the housing 130 may be prevented from second latches of the main body 120 and the housing 130.

The housing 130 may include a plurality of slots 135 provided at a side wall portion of the housing 130 and formed on the housing 130 in a height direction. For example, each of the plurality of slots 135 may be recessed in the +z direction from the lower end of the housing 130. The plurality of slots 135 may be spaced apart from each other in the x-axis direction that corresponds to the longitudinal direction of the cable 140. By the plurality of slots 135, when the side wall portion of the housing 130 is caught by the main body 120, the side wall portion of the housing 130 may elastically transform in an outward direction. When the side wall portion of the housing 130 is separated from the main body 120, the side wall portion of the housing 130 may be restored in its original shape.

The main body 120 may include a body case 121, a separation prevention body protrusion 122, a coupling body protrusion 123, and an axis direction body protrusion 124. The housing 130 may include a housing case 131, a separation prevention housing protrusion 132, a coupling housing protrusion 133, and a housing accommodation part 134.

The separation prevention body protrusion 122 of the main body 120 and the separation prevention body protrusion 132 of the housing 130 may be referred to as the first latch. The coupling body protrusion 123 of the main body 120 and the coupling housing protrusion 133 of the housing 130 may be referred to as the second latch.

The body case 121 may include a hollow for accommodating a plurality of terminals therein. The body case 121 may be connected to a PCB.

The separation prevention body protrusion 122 may protrude from the side surface of the body case 121. The side surface of the body case 121 may be a surface of which a normal is provided in parallel with the y-axis direction. The separation prevention body protrusion 122 may be provided near the upper end of the body case 121. The separation prevention body protrusion 122 may prevent the housing 130 from being separated unintentionally in the upward direction as the separation prevention body protrusion 122 is caught by the housing 130. The separation prevention body protrusion 122 may be in surface contact with the housing 130. Contact surfaces of the separation prevention body protrusion 122 and the housing 130 may be downwardly inclined toward the outward direction. The contact surfaces of the separation prevention body protrusion 122 and the housing 130 may include an inclined surface that approaches a PCB in a direction away from the body case 121.

The coupling body protrusion 123 may protrude from the side surface of the body case 121. When the housing 130 is fully coupled to the main body 120, the coupling body protrusion 123 may be caught by the main body 120. The coupling body protrusion 123 may be disposed on the lower side of the separation prevention body protrusion 122. The coupling body protrusion 123 may be provided at a position spaced apart from the separation prevention body protrusion 122 in a direction parallel with the longitudinal direction of the cable 140, that is, the x-axis direction. The coupling body protrusion 123 may be in surface contact with the housing 130. Contact surfaces of the coupling body protrusion 123 and the housing 130 may be downwardly inclined toward the outward direction. The contact surfaces of the coupling body protrusion 123 and the housing 130 may include an inclined surface that approaches a PCB in a direction away from the body case 121.

The axis direction body protrusion 124 may protrude from the rear surface of the body case 121. The rear surface of the body case 121 may be a surface of which a normal is provided in parallel with the −x direction. The axis direction body protrusion 124 may be inserted into the housing 130. The axis direction body protrusion 124 may be in surface contact with the housing 130. Contact surfaces of the axis direction body protrusion 124 and the housing 130 may be downwardly inclined toward the outward direction. The contact surfaces of the axis direction body protrusion 124 and the housing 130 may include an inclined surface that approaches a PCB in a direction away from the body case 121.

The housing case 131 may include a hollow for accommodating the main body 120 therein.

The separation prevention housing protrusion 132 may protrude from an inner side surface of the housing case 131. The separation prevention housing protrusion 132 may be provided near the lower end of the housing case 131. The separation prevention housing protrusion 122 may prevent the housing 130 from being separated unintentionally in the upward direction as the separation prevention housing protrusion 132 is caught by the main body 120. The separation prevention housing protrusion 132 may be in surface contact with the separation prevention body protrusion 122, as shown in FIG. 9. Contact surfaces of the separation prevention housing protrusion 132 and the separation prevention body protrusion 122 may be downwardly inclined toward the outward direction. The contact surfaces of the separation prevention body protrusion 122 and the separation prevention housing protrusion 132 may include an inclined surface that approaches a PCB in a direction away from the inner side surface of the housing case 131.

The coupling housing protrusion 133 may protrude from the inner side surface of the housing case 131, as shown in FIG. 11. The coupling housing protrusion 133 may be disposed upper than the separation prevention housing protrusion 132. While the main body 120 is fully coupled to the housing 130, the coupling housing protrusion 133 may be caught by the housing 130. The coupling housing protrusion 133 may be in surface contact with the coupling body protrusion 123. Contact surfaces of the coupling housing protrusion 133 and the coupling body protrusion 123 may be downwardly inclined toward the outward direction. Contact surfaces of the coupling housing protrusion 133 and the coupling body protrusion 123 may include an inclined surface that approaches a PCB in a direction away from the inner side surface of the housing case 131.

The housing accommodation part 134 may accommodate the axis direction body protrusion 124. The housing accommodation part 134 may be a groove recessed from the inner side surface of the housing case 131 or a hole penetrating the housing case 131. Contact surfaces of the housing accommodation part 134 and the axis direction body protrusion 124 may be downwardly inclined toward the outward direction. Contact surfaces of the housing accommodation part 134 and the axis direction body protrusion 124 may include an inclined surface that approaches a PCB in a direction away from the inner side surface of the housing case 131.

In addition to a coupling force of the second latch (e.g., the main body 120 and the housing 130), the axis direction body protrusion 124 and the housing accommodation part 134 may more stably couple the main body 120 to the housing 130. The second latch may fix the main body 120 and the housing 130 from the +y side and/or the −y side and the axis direction body protrusion 124 and the housing accommodation part 134 may fix the main body 120 and the housing 130 from the −x side. The connector assembly may implement a double latch structure through the axis direction body protrusion 124 and the housing accommodation part 134 as well as the second latch. More particularly, while the cable 140 is lifted in the z-axis direction, the axis direction body protrusion 124 and the housing accommodation part 134 may reduce or prevent an event in which the housing 130 is unintentionally lifted up in the z-axis direction.

Figure 12:
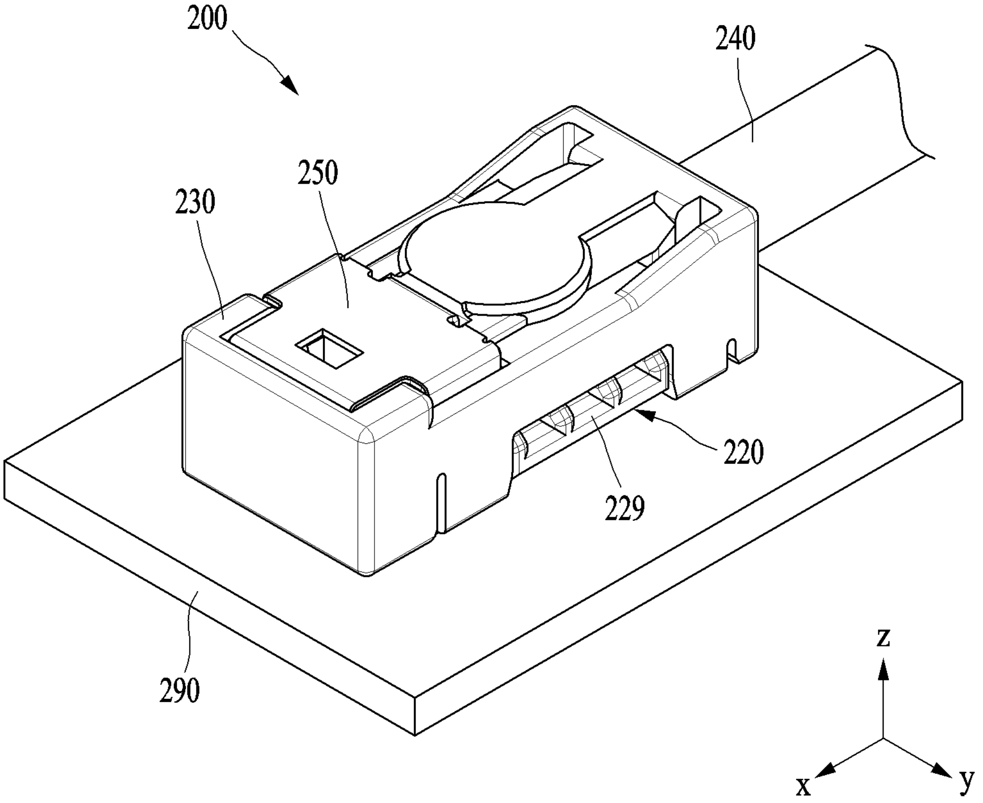
FIG. 12 is a perspective view of a connector assembly according to an embodiment.
Figure 13:
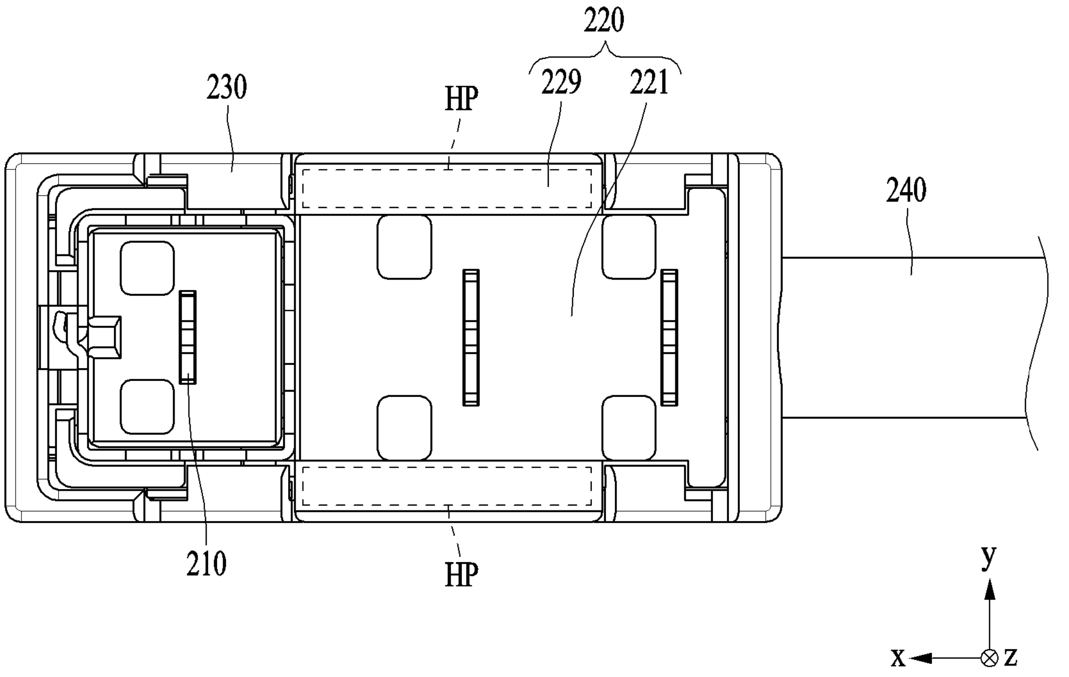
FIG. 13 is a bottom view of the connector assembly from which a PCB is omitted, according to an embodiment.
Figure 14:
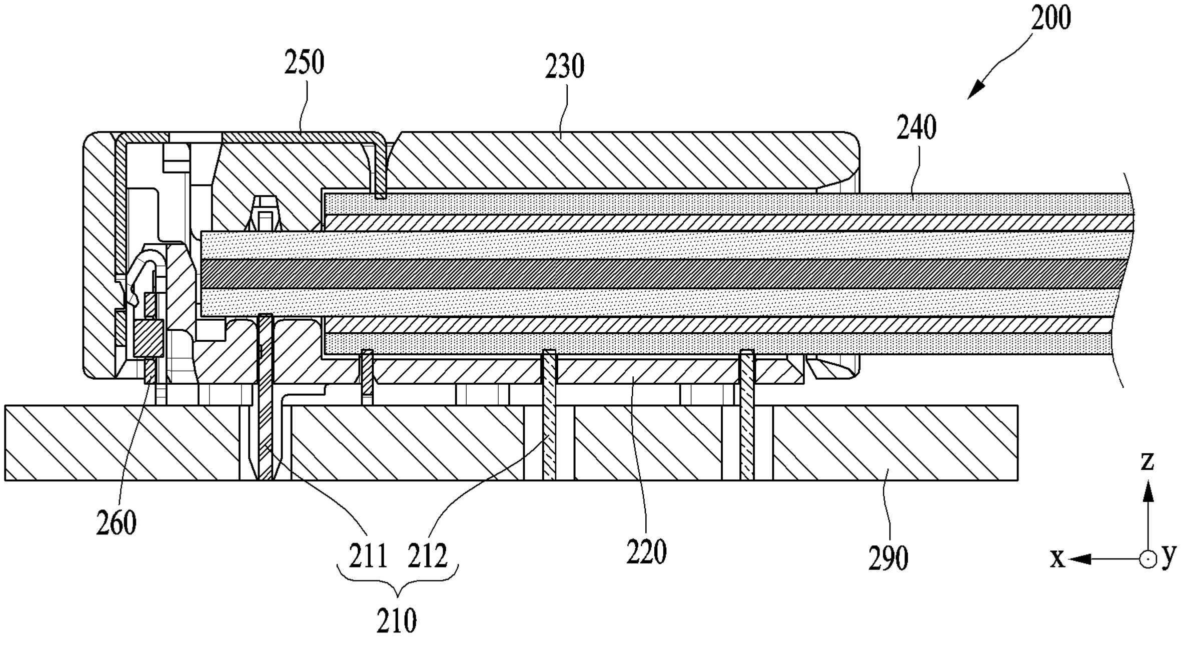
FIG. 14 is a cross-sectional view of a connector assembly according to an embodiment.
Figure 15:
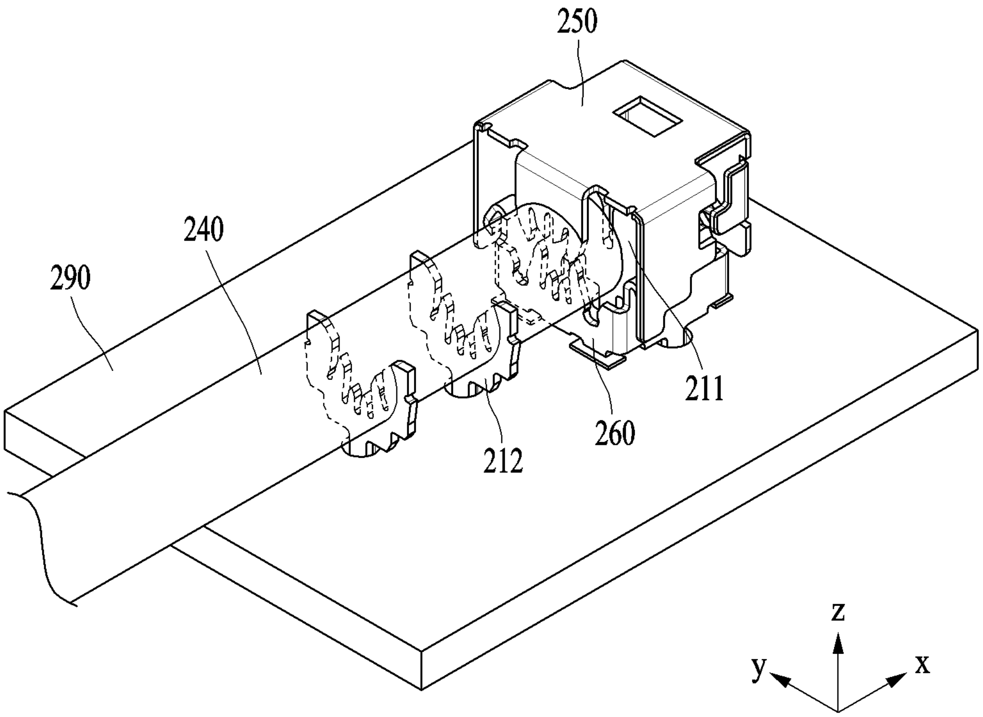
FIG. 15 is a perspective view of the connector assembly from which a main body and a housing are omitted, according to an embodiment.
Figure 16:
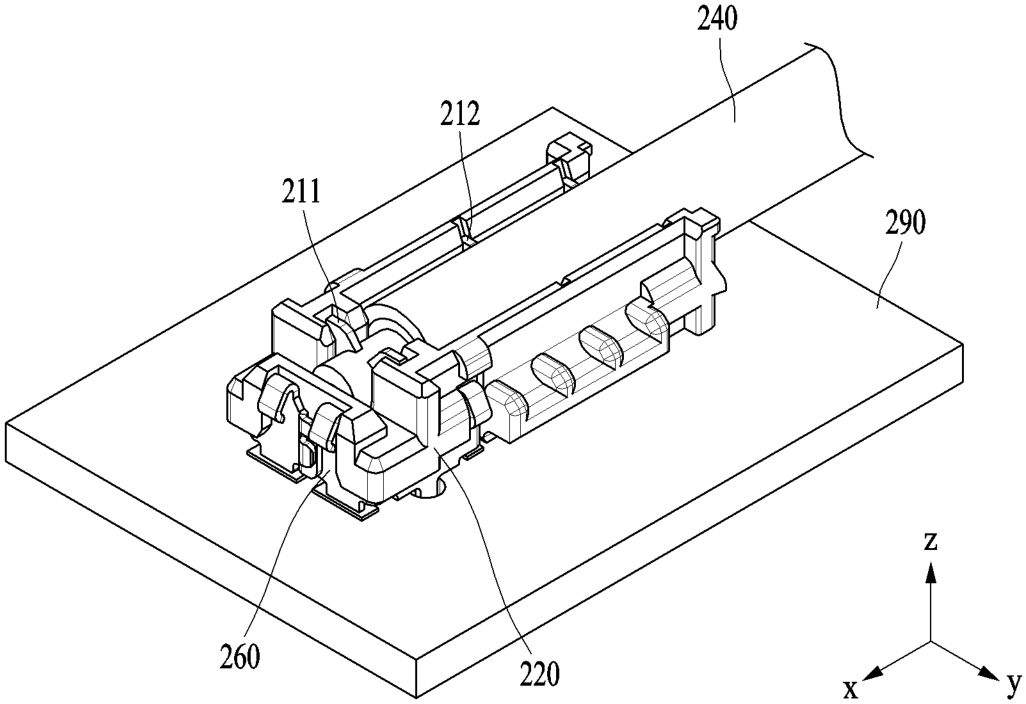
FIG. 16 is a perspective view of the connector assembly from which a housing and a cover shield are omitted, according to an embodiment.

FIG. 12 is a perspective view of a connector assembly according to an embodiment. FIG. 13 is a bottom view of the connector assembly of which a PCB is omitted, according to an embodiment. FIG. 14 is a cross-sectional view of the connector assembly according to an embodiment. FIG. 15 is a perspective view of the connector assembly of which a main body and a housing are omitted, according to an embodiment. FIG. 16 is a perspective view of the connector assembly from which a housing and a cover shield are omitted, according to an embodiment.

Referring to FIGS. 12 to 16, a connector assembly 200 may include a PCB 290, a cable 240, and a connector. The connector may electrically and physically connect the PCB 290 to the cable 240. The connector may include a plurality of terminals 210, a main body 220, a housing 230, a cover shield 250, and a base shield 260. The plurality of terminals 210 may include a conductor terminal 211 and a shield terminal 212. A plurality of shield terminals 212 may be provided.

The main body 220 may accommodate the plurality of terminals 210 and the base shield 260. The main body 220 may include a body case 221 and a body arm 229, as shown in FIG. 13. The body arm 229 may protrude from the body case 221 in the outward direction. The body arm 229 may be inserted into the housing 130. A plurality of holding points HP may be provided on the body arm 229. An outer surface of the body arm 229 may be parallel with the outer surface of the housing 230. The housing 230 may include a space for accommodating the body arm 229 therein.

The housing 230 may be coupled to the main body 220. The housing 230 may accommodate the cover shield 250.

The body arm 229 may be inserted into the housing 230 and may be exposed in the outward direction. The bottom surface of the body arm 229 may be spaced further from the PCB 290 than the bottom surface of the housing 230. According to the structure described above, insertion of an external jig (e.g., the jig 9 of FIG. 1B) may be easily implemented. In addition, it may be easy to visually identify whether the external jig properly supports the main body 220.

The bottom surface of the body arm 229 may not be parallel with the bottom surface of the body case 221. More particularly, the bottom surface of the body arm 229 may be disposed upper than the bottom surface of the body case 221. The length of a distance of the bottom surface of the body arm 229 from the PCB 290 may be greater than the length of a distance of the bottom surface of the body case 221 from the PCB 290. According to the structure described above, an external jig may more easily approach the holding point HP and the total height of the connector may decrease when the holding point HP is formed on the body arm 229 rather than when the holding point HP is formed on the body case 221.

The cover shield 250 and the base shield 260 may enclose the front end of the cable 240 such that noise occurrence may be effectively prevented. The cover shield 250 may be mounted on the housing 230. The base shield 260 may be disposed on the PCB 290 and may be connected to the cover shield 250.

By the cover shield 250 and the base shield 260, noise occurring in an exposed portion of the cable 240 that is not enclosed by a cable shield may be shielded. At least a portion of the cover shield 250 may cut an upper portion of an outer jacket of the cable 240 and may contact the cable shield. At least a portion of the base shield 260 may cut a lower portion and both side portions of the outer jacket of the cable 240 and may contact the cable shield.

Figure 17:
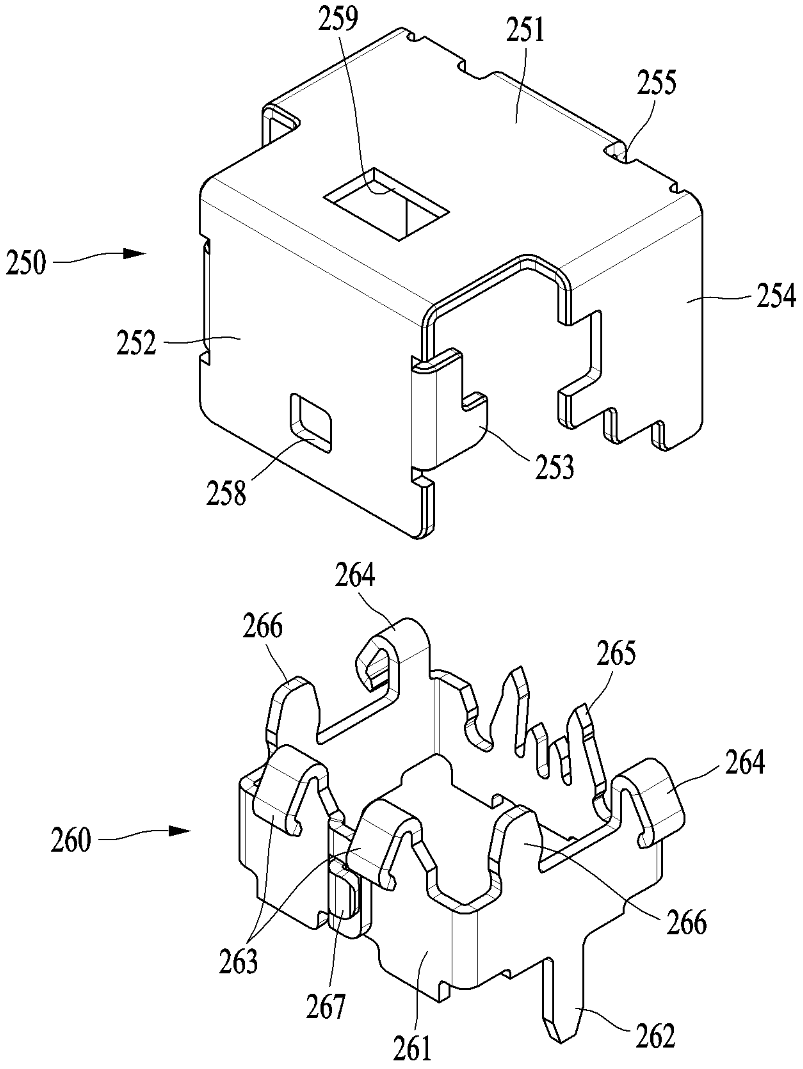
FIG. 17 is an exploded perspective view of a cover shield and a base shield according to an embodiment.
Figure 18:
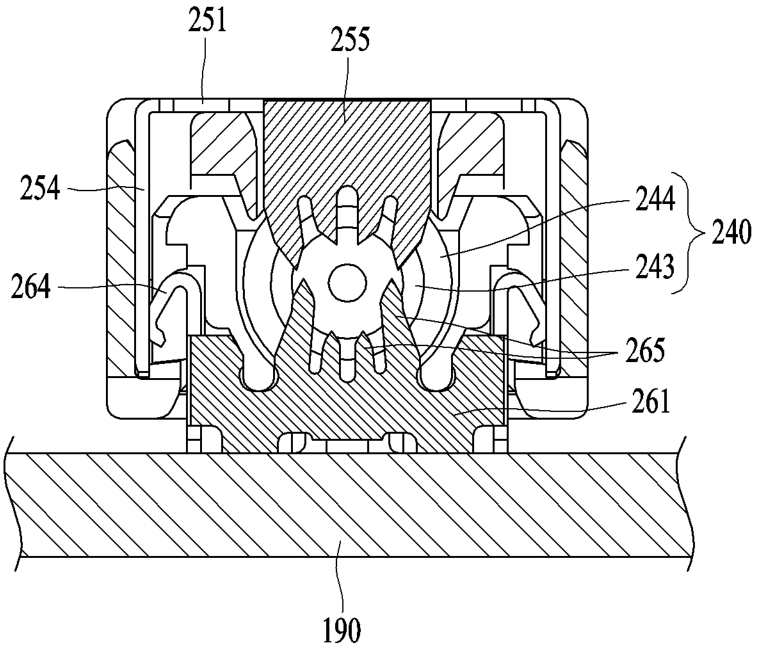
FIG. 18 is a cross-sectional view of a connector assembly according to an embodiment.
Figure 19:
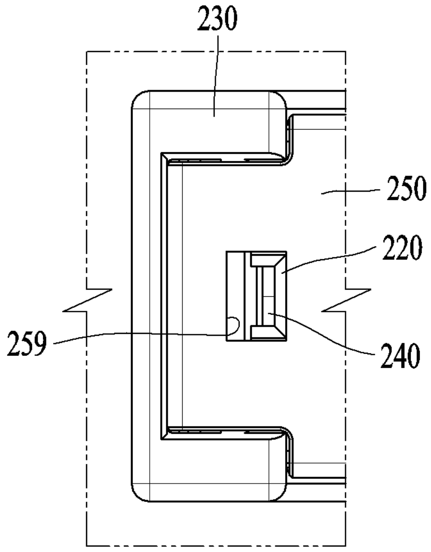
FIG. 19 is a partially enlarged view of the connector assembly according to an embodiment.

FIG. 17 is an exploded perspective view of a cover shield and a base shield according to an embodiment. FIG. 18 is a cross-sectional view of a connector assembly according to an embodiment. FIG. 19 is a partially enlarged view of the connector assembly according to an embodiment.

Referring to FIGS. 17 to 19, the cover shield 250 may include a cover base 251, a front cover plate 252, a cover arm 253, a side cover plate 254, a rear cover plate 255, a front cover hole 258, and an upper cover hole 259.

The cover base 251 may cover the upper side of the cable 240. The cover base 251 may cover, for example, the front end of the cable 240. The cover base 251 may include a plate shape.

The front cover plate 252 may extend from the cover base 251 in the downward direction and may be connected to the base shield 260. The front cover plate 252 may cover the front of the cable 240. The front cover plate 252 may prevent noise from escaping in the front direction.

The cover arm 253 may extend from the front cover plate 252 in the rear direction. The cover arm 253 may extend, for example, from an edge of the front cover plate 252 in the rear direction. The cover arm 253 may partially cover a gap space between the front cover plate 252 and the side cover plate 254.

The side cover plate 254 may extend from the cover base 251 in the downward direction and may be connected to the base shield 260. The front cover plate 252 may cover a side of the cable 240. The front cover plate 252 may prevent noise from escaping in the side direction.

The rear cover plate 255 may extend from the cover base 251 in the downward direction. The rear cover plate 255 may cut an upper portion of an outer jacket 244 of the cable 240 and may contact a cable shield 243 of the cable 240. The rear cover plate 255 may contact the cable shield 243 to perform a noise shield function together with the cable shield 243. The drawing illustrates that the rear cover plate 255 penetrates the cable shield 243, however, this is only for ease of illustration. While the main body 220 is coupled to the housing 230, the rear cover plate 255 may be transformed by being pressed by the cable shield 243. For example, the end portion of the rear cover plate 255 may be transformed.

The rear cover plate 255 may be omitted. For example, the front cover plate 252 and the side cover plate 254 may extend from the cover base 251, however, the rear cover plate 255 may not be provided. When the rear cover plate 255 is provided, a noise shield effect may improve. Even if the rear cover plate 255 is not provided, the noise shield effect may improve through the cover base 251, the front cover plate 252, and the side cover plate 254.

The front cover hole 258 may penetrate the front cover plate 252. The front cover hole 258 may accommodate a shield fastener 267, as described below.

The upper cover hole 259 may penetrate the cover base 251. The upper cover hole 259 may expose the front end of the cable 240 to the outside. A worker may visually observe whether the cable 240 is coupled to the housing 230 at a proper position through the upper cover hole 259.

The base shield 260 may be connected to the cover shield 250. The base shield 260 may include a shield body 261, a shield leg 262, a shield front arm 263, a shield side arm 264, a shield rear arm 265, a shield protrusion 266, and the shield fastener 267.

The base shield 260 may be a modified design of a shield terminal (e.g., the shield terminal 112 of FIG. 4). For example, the shield rear arm 265 of the base shield 260 may correspond to the shield terminal (e.g., the shield terminal 112 of FIG. 4). Herein, the base shield 260 may be referred to as a shield terminal. The cover shield 250 may be coupled to the housing 230 and may contact any one of a plurality of shield terminals.

The base shield 260 may be only constituted by the shield rear arm 265 and the shield side arm 264. For example, the base shield 260 may be only constituted by the shield rear arm 265 and the shield side arm 264 and the cover shield 250 may include the cover base 251 and the side cover plate 254 extending from the cover base 251 and contacting the shield side arm 264.

The shield body 261 may have a ring shape. For example, the shield body 261 may be manufactured in a plate shape and may have a roughly rectangular shape by being bent four times. A portion to which both ends of the shield body 261 are connected may be the shield fastener 267. A protrusion may be provided at one end of the shield body 261 and a clasp may be provided at another end of the shield body 261. The protrusion and the clasp may be referred to as the shield fastener 267.

The shield leg 262 may extend from the shield body 261 in the downward direction and may be connected to the PCB 290. The shield leg 262 may be inserted into the PCB 290.

The shield front arm 263 may extend from the shield body 261. The shield front arm 263 may have a shape that is bent at least once. An end of the shield front arm 263 may protrude more outwardly than the shield body 261. The shield front arm 263 may be structurally elastic. The shield front arm 263 may be transformed by being pressed by the cover shield 250. The shield front arm 263 may be provided at the front portion of the shield body 261.

The shield side arm 264 may extend from the shield body 261. The shield side arm 264 may have a shape that is bent at least once. An end of the shield side arm 264 may protrude more outwardly than the shield body 261. The shield side arm 264 may be structurally elastic. The shield side arm 264 may be transformed by being pressed by the cover shield 250. The shield side arm 264 may be provided at the side portion of the shield body 261.

The shield rear arm 265 may extend from the shield body 261. The shield rear arm 265 may cut a lower portion and a side portion of the outer jacket 244 of the cable 240 and may contact the cable shield 243 of the cable 240. The drawing illustrates that the shield rear arm 265 penetrates the cable shield 243, however, this is only for ease of illustration. While the main body 220 is coupled to the housing 230, the shield rear arm 265 may be transformed by being pressed by the cable shield 243. For example, an end portion of the shield rear arm 265 may be transformed.

The shield protrusion 266 may extend from the shield body 261. While the cover shield 250 is coupled to the base shield 260, the shield protrusion 266 may be between the cover arm 253 and the side cover plate 254. The shield protrusion 266 may cover an empty space between the cover arm 253 and the side cover plate 254.

Figure 20:
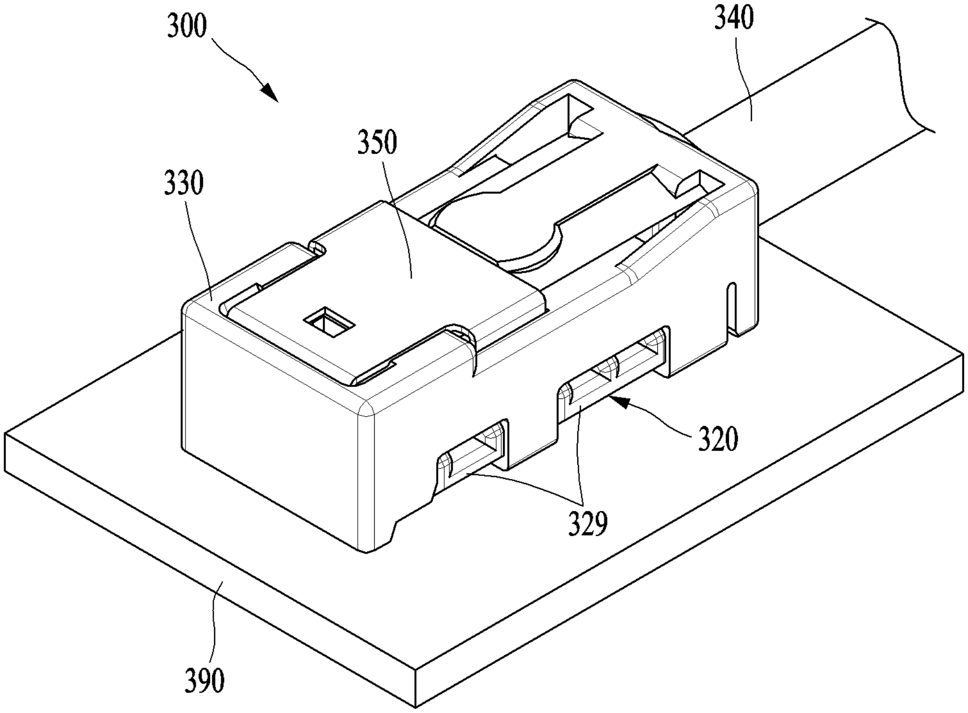
FIG. 20 is a perspective view of a connector assembly according to an embodiment.

FIG. 20 is a perspective view of a connector assembly according to an embodiment.

Referring to FIG. 20, a connector assembly 300 may include a PCB 390, a cable 340, and a connector. The connector may electrically and physically connect the PCB 390 to the cable 340. The connector may include a plurality of terminals (e.g., the plurality of terminals 210 of FIG. 14), a main body 320, a housing 330, a cover shield 350, and a base shield (e.g., the base shield 260 of FIG. 14). The main body 320 may include a body arm that is inserted into the housing 330. A plurality of body arms 329 may be provided by being spaced apart from each other in the longitudinal direction of the cable 340.

FIG. 21 is a perspective view of a connector assembly according to an embodiment.

Referring to FIG. 21, a connector assembly 400 may include a PCB 490, a cable 440, and a connector. The connector may electrically and physically connect the PCB 490 to the cable 440. The connector may include a plurality of terminals (e.g., the plurality of terminals 210 of FIG. 14), a main body 420, and a housing 430. The main body 420 may include at least one body arm 429 that is inserted into the housing 430.

Embodiments have been described above with reference to specific matters such as specific components and limited embodiments and with reference to drawings, but these are provided to facilitate overall understanding. Also, the present disclosure is not limited to the above-described embodiments, and various modifications and variations are possible from these descriptions by those skilled in the art to which the present disclosure pertains. Accordingly, the scope of the present disclosure is defined not by the detailed description, but by the claims and their equivalents, and all variations within the scope of the claims and their equivalents are to be construed as being included in the disclosure.

What is claimed is:

1. A connector assembly, comprising:

a printed circuit board (PCB);

a plurality of terminals disposed on the PCB;

a main body disposed on the PCB and supporting the terminals, the main body having a holding point to contact an external jig, a space into which the external jig is inserted is provided between the main body and the PCB;

a cable supported by the terminals; and a housing coupled to the main body, covering the cable, and spaced apart from the PCB.

2. The connector assembly of claim 1, wherein the holding point is provided on a surface of the main body facing the PCB.

3. The connector assembly of claim 2, wherein the main body includes a body case disposed on the PCB and a coupling body protrusion protruding from the body case, the coupling body protrusion is caught by the housing while the housing is fully coupled to the main body.

4. The connector assembly of claim 3, wherein the housing includes a housing case connected to the body case and a coupling housing protrusion protruding from an inner side surface of the housing case, the coupling housing protrusion is able to be caught by the coupling body protrusion.

5. The connector assembly of claim 4, wherein the coupling body protrusion and the coupling housing protrusion are in surface contact with each other.

6. The connector assembly of claim 5, wherein a contact surface of the coupling body protrusion and a contact surface of the coupling housing protrusion each have an inclined surface approaching the PCB in a direction away from the body case.

7. The connector assembly of claim 4, wherein the main body has a separation prevention body protrusion protruding from the body case, the separation prevention body protrusion is provided to be caught by the housing before the housing is fully coupled to the main body.

8. The connector assembly of claim 7, wherein the separation prevention body protrusion is provided at a position closer to the PCB than the coupling body protrusion.

9. The connector assembly of claim 8, wherein the housing includes a separation prevention housing protrusion protruding from an inner side surface of the housing case and able to be caught by the separation prevention body protrusion.

10. The connector assembly of claim 7, wherein the separation prevention body protrusion and the separation prevention housing protrusion are in surface contact with each other.

11. The connector assembly of claim 10, wherein a contact surface of the separation prevention body protrusion and a contact surface of the separation prevention housing protrusion each have an inclined surface approaching the PCB in a direction away from the body case.

12. The connector assembly of claim 4, wherein the main body includes an axis direction body protrusion protruding from the body case in a direction parallel with a longitudinal direction of the cable and coupled to the housing.

13. The connector assembly of claim 12, wherein the housing includes a housing accommodation part accommodating the axis direction body protrusion therein.

14. The connector assembly of claim 1, wherein the cable includes an inner conductor, an insulator enclosing the inner conductor, a cable shield enclosing the insulator, and an outer jacket enclosing the cable shield.

15. The connector assembly of claim 14, wherein the plurality of terminals include a conductor terminal cutting the insulator and contacting the inner conductor, and a plurality of shield terminals cutting the outer jacket and contacting the cable shield.

16. The connector assembly of claim 15, further comprising a cover shield coupled to the housing and contacting any one of the plurality of shield terminals.

17. The connector assembly of claim 1, wherein the main body includes a body case disposed on the PCB and a body arm protruding from the body case, inserted into the housing, and comprising the holding point.

18. The connector assembly of claim 17, wherein the body arm is one of a plurality of body arms, the body arms are spaced apart from each other in a longitudinal direction of the cable.

19. A connector, comprising:

a plurality of terminals disposed on a printed circuit board (PCB);

a main body disposed on the PCB and supporting the plurality of terminals, the main body having a holding point contacting an external jig, a space into which the external jig is inserted is provided between the main body and the PCB; and a housing coupled to the main body, covering a cable, and spaced apart from the PCB.

20. The connector of claim 19, wherein the cable has an inner conductor, an insulator enclosing the inner conductor, a cable shield enclosing the insulator, and an outer jacket enclosing the cable shield.

* * * * *